United States Patent [19]
Ogilvie

[11] Patent Number: 5,894,862
[45] Date of Patent: Apr. 20, 1999

[54] HYDRAULIC DAMPER

[75] Inventor: Kenneth M. Ogilvie, Arcadia, Calif.

[73] Assignee: Vickers, Incorporated, Maumee, Ohio

[21] Appl. No.: 08/791,675

[22] Filed: Jan. 30, 1997

[51] Int. Cl.[6] .................................................. F16L 55/04
[52] U.S. Cl. ........................... 138/31; 138/30; 303/87; 267/221
[58] Field of Search ................... 138/30, 31; 303/87; 293/107; 188/266.5, 286; 267/221

[56] References Cited

U.S. PATENT DOCUMENTS

| | | | |
|---|---|---|---|
| 2,572,270 | 10/1951 | Majneri | 303/87 |
| 2,655,937 | 10/1953 | Harris | 138/31 |
| 4,655,440 | 4/1987 | Eckert | 267/64.11 |
| 4,769,990 | 9/1988 | Bach et al. | 138/31 |
| 5,035,469 | 7/1991 | Geilen et al. | 303/87 |
| 5,401,086 | 3/1995 | Nishikimi et al. | 303/87 |
| 5,460,438 | 10/1995 | Hellmann et al. | 138/30 |
| 5,551,767 | 9/1996 | Linkner, Jr. | 138/30 |
| 5,611,413 | 3/1997 | Feigel | 188/299 |
| 5,673,978 | 10/1997 | Linkner, Jr. | 303/87 |

Primary Examiner—Denise L. Ferensic
Assistant Examiner—James F. Hook
Attorney, Agent, or Firm—Jones, Day, Reavis & Pogue

[57] ABSTRACT

A hydraulic damper is disclosed for reducing undesirable pressure differentials in a hydraulic system. The damper comprises a body assembly, including first and second inlet ports for connecting the damper to a hydraulic system. A pair of lap assemblies are provided for equalizing pressure differentials between the inlet ports. Each lap assembly is in fluid communication with each of said inlet ports. A metered passageway is provided for fluidly connecting each of said inlet ports. A slide is movably received within the lap assembly to permit reciprocal motion. The slide alternately blocks and unblocks the metered passageway in response to a predetermined pressure across one of the respective inlet ports, in order to equalize the pressure differential between the ports.

8 Claims, 3 Drawing Sheets

HYDRAULIC DAMPER

BACKGROUND OF THE INVENTION

The present invention is directed to the field of hydraulic dampers for reducing undesired pressure surges or oscillations in systems requiring hydraulic damping. This invention has particular applicability to the damping of periodically varying motions in systems which result in noise or oscillation in hydraulic pressure.

In a particular example, undesirable oscillation in a hydraulic system occurs in the nose wheel assembly of an aircraft, which is typically steered using a hydraulic system. The pivot point of the wheel is typically located at a point ahead of the wheel axle, rather like a caster. The mass of wheel is behind the pivot, and the dynamics of the system are such that the wheel tends to "shimmy" while moving along the ground, in a manner similar to other commonly-observed caster-type wheels, e.g. the wheels on a shopping cart.

Such wheel shimmy results in wear and tear on the wheel and supporting strut which may increase exponentially resulting structural damage to the aircraft. Suppression of shimmy often requires compromises in steering control accuracy. It is desirable to provide a hydraulic means of damping which does not compromise steering accuracy.

One known hydraulic damper uses a piston and a pair of springs to form a compliance, and a hydraulic orifice to form a damping control which reduces rapid shimmy motion while permitting the relatively slow motion of steering. However, such dampers include a number of mechanical elements.

Hydraulic systems are prone to pressure surges which occur when large valves are quickly opened or closed. This phenomenon, also known as "water hammer," is also observed in common household plumbing when faucets are abruptly turned off, producing a sound and a shock to the pipes. Such surges also create additional wear and tear in hydraulic systems, thereby shortening the operational life of the respective components.

SUMMARY OF THE INVENTION

In view of the above-indicated drawbacks and disadvantages of previous systems, there is therefore a need for a hydraulic damper which reduces undesirable pressure differentials within a hydraulic system.

There is also a need for a hydraulic damper which reduces the amplitude of sinusoidally-varying pressure variations.

There is also a need for a hydraulic damper which reduces pressure differentials produced by variations in mechanical components external to the hydraulic system.

There is also a need for a hydraulic damper which can be selectively disabled upon operation of the hydraulic system.

There is also a need for a hydraulic damper which relies on the compressibility of fluids.

These needs and others are satisfied by the present invention in which a damper is provided for reducing pressure differentials in a hydraulic system. The damper comprises a body assembly, including first and second inlet ports for connecting the damper to a hydraulic system. A pair of lap assemblies are provided for equalizing pressure differentials between the inlet ports. Each lap assembly is in fluid connection with each of said inlet ports. A metered passageway is provided for fluidly connecting each of the inlet ports. A slide is movably received within the lap assembly to permit reciprocal motion. The slide alternately blocks and unblocks the metered passageway in response to a predetermined pressure across one of the respective inlet ports, in order to equalize the pressure differential between the ports. A chamber is in fluid connection with the slide, wherein the chamber retains a quantity of fluid for creating a counter-pressure to resist the motion of the slide.

As will be appreciated, the invention is capable of other and different embodiments, and its several details are capable of modifications in various respects, all without departing from the invention. Accordingly, the drawings and description are to be regarded as illustrative in nature and not restrictive.

BRIEF DESCRIPTION OF THE DRAWINGS

The embodiments of the invention will now be described by way of example only, with reference to the accompanying figures wherein the members bear like reference numerals and wherein.

DETAILED DESCRIPTION OF THE INVENTION

Figure 1:
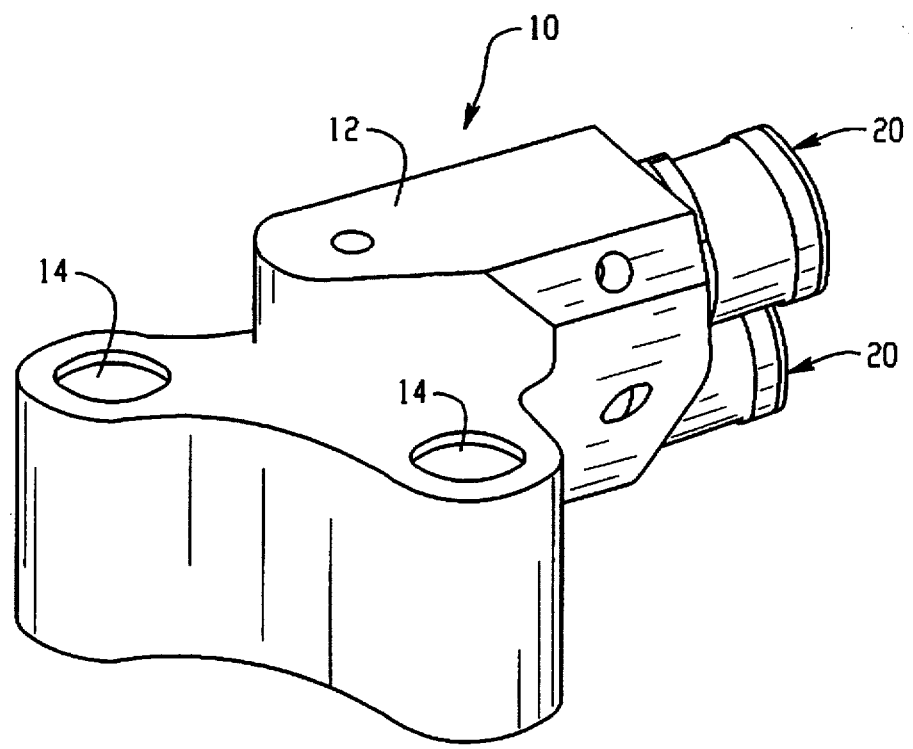
FIG. 1 is an oblique view depicting the hydraulic damper of the present invention.
Figure 2:
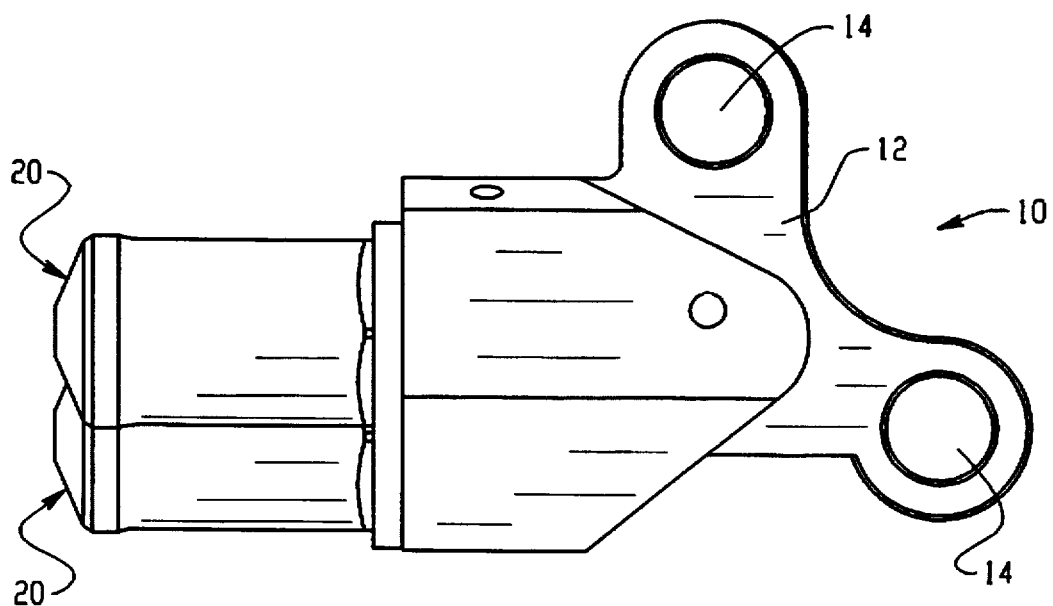
FIG. 2 is an overhead view showing the hydraulic damper of the present invention.

The figures particularly illustrate the preferred embodiment of the hydraulic damper 10 of the present invention. A body assembly 12 is provided including first and second inlet ports 14 for connecting the damper 10 to an external hydraulic system.

A pair of lap assemblies 20 are provided for equalizing pressure differentials that arise between the inlet ports 14. The lap assemblies 20 are each enclosed with a closure 22, which is received within a recess in the body assembly 12. The body assembly 12 includes a plurality of cross-connection passageways 16 which are formed so that each lap assembly 20 is connected to each of the inlet ports 14. The cross-connection passageways 16 can be bored into the body assembly 12 or formed in other ways such as are commonly used.

Figure 4:
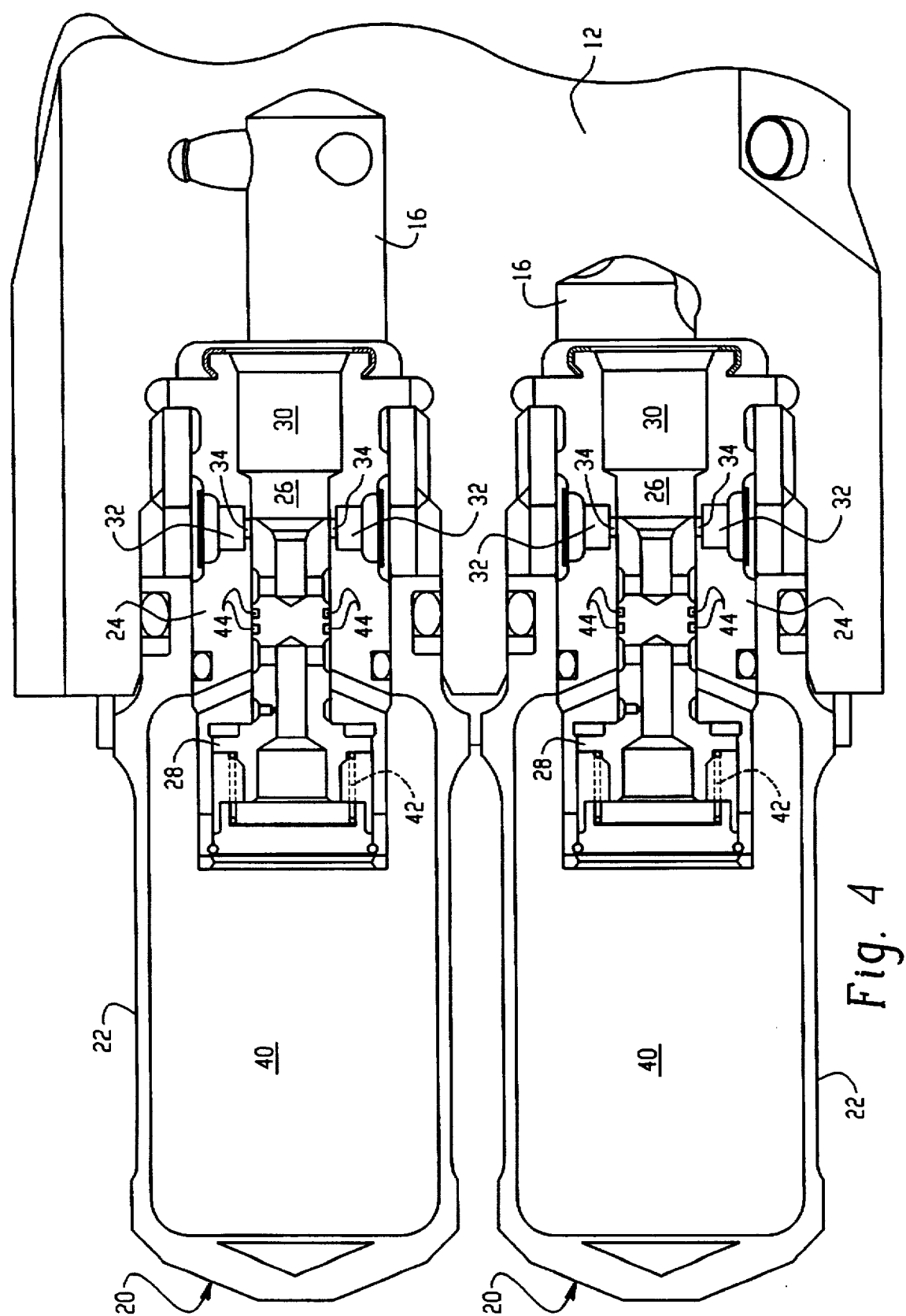
FIG. 4 is a detailed sectional profile illustrating the components of the present pair of lap assemblies.

As seen especially in FIG. 4, each lap assembly 20 further includes a sleeve 24 which is retained within the closure 22. The lap assembly 20 is preferably formed with a longitudinal axis, and the closure 22 and sleeve 24 are centered along the axis. The sleeve 24 is formed with an axial passageway 26, bored along the lap assembly axis. A slide 28 is movably received within the sleeve 24, for reciprocal motion back and forth within the axial passageway 26.

Figure 3:
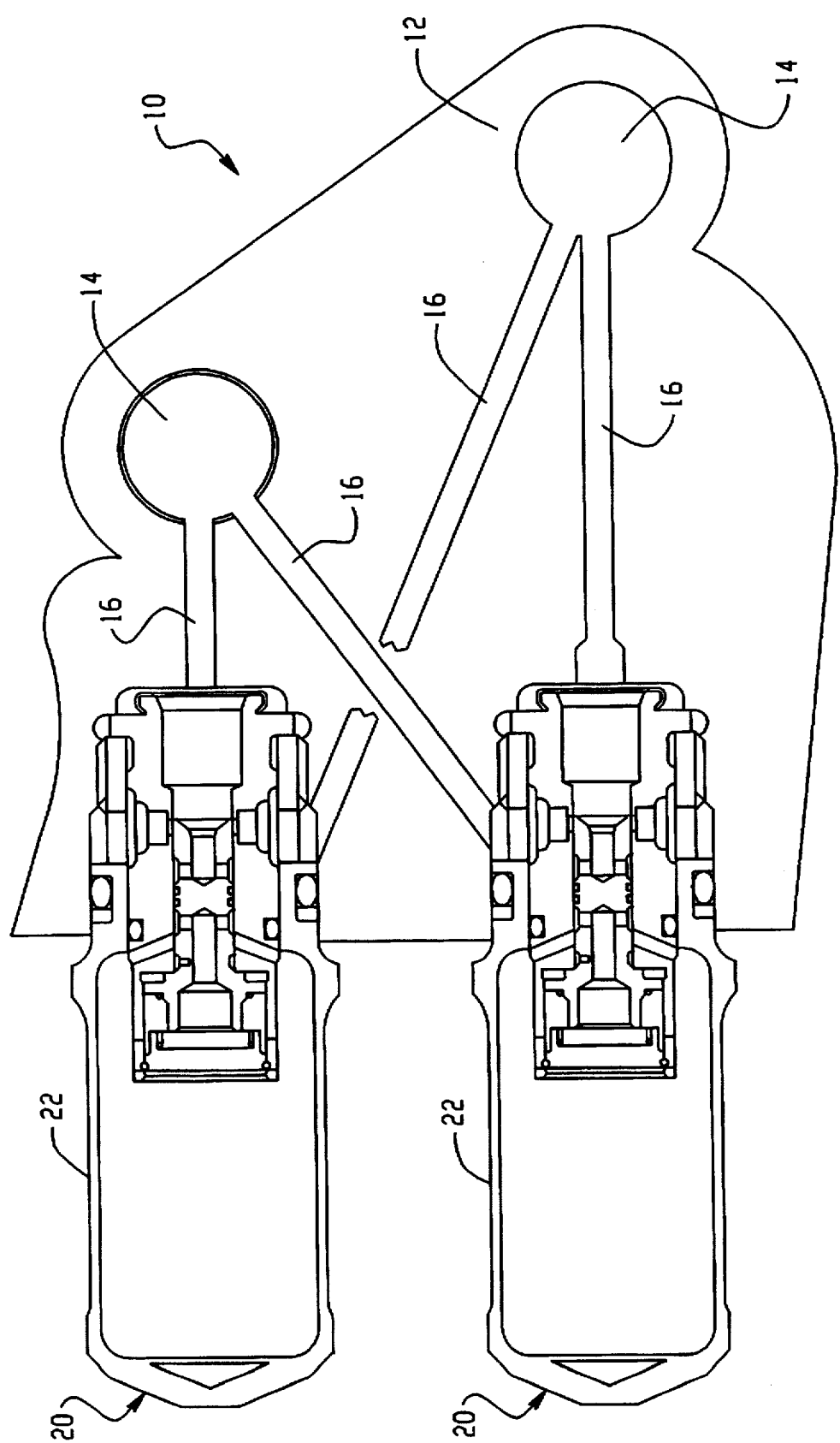
FIG. 3 is a sectional profile detaching the internal structure of the present hydraulic damper.

An internal cavity 30 is formed within the sleeve 24. As best seen in FIG. 3, each internal cavity 30 is respectively connected to one of said inlet ports 14 through a respective cross-connection passageway 16. An external cavity 32 is preferably formed radially along the external periphery of the sleeve 24. The external cavity 32 is preferably generally annular in shape. As best seen in FIG. 3, each external cavity 32 is connected to each inlet port 14 through a respective cross-connection passageway 16. The external cavity 32 is connected to the internal cavity 30 through a metered passageway 34, in order to fluidly connect the inlet ports 14 in each lap assembly 20. In the preferred embodiment, the metered passageway 34 is a plurality of radial circumferential slots preferably four in number, located at 90 degrees apart. The slots 34 are preferably formed lengthwise in a plane perpendicular to the lap assembly axis.

During operation, a pressure increase at an inlet 14 creates a pressure increase at the respectively connected internal cavity 30, which creates a force against the respective slide 28 that tends to displace the slide 28 away from the internal cavity 30. The closure 22 includes a chamber 40 which is filled with fluid, creating a counter-pressure which resists the displacement of the slide 28 into the chamber 40 caused by the high pressure fluid. In this way, the chamber fluid acts as a spring of great stiffness, to forwardly bias the slide 28.

The fluid in the chamber acts as a spring by exploiting the compressibility of fluids. Contrary to popular notions, fluids are not infinitely rigid, and thus permit a small but non-negligible compressibility. Under a pressure of about 2000 psi (such as is common in hydraulic systems), fluids have a compressibility of about 1%. In one working embodiment, the chamber 40 retains about one cubic inch of fluid. Under common hydraulic pressures, the slide 28 can be displaced about 0.020 inches, due to the compressibility of the fluid.

The slide 38 is normally retained in a position where it blocks the metered passageway 34. In a static pressure condition, the slide 28 is urged forward by a spring 42 having a low spring constant, which applies a small biasing force. Upon application of pressure in the internal cavity 30, the slide is urged toward the chamber 40, unblocking the metered passageway 34, and permitting fluid to pass into the external cavity 32. In this way, the pressures between the cavities 30, 32, and thus the inlet ports 14, are equalized. In this way, pressure surges resulting from the opening and closing of valves upstream of either inlet 14 can be moderated or eliminated by dissipating the surge through the damper.

While the invention can be used to reduce surges and pressure differentials from any source, the invention has particular applicability to controlling wheel shimmy in an aircraft nose wheel. As the shimmy transmits its oscillation to the hydraulic steering assembly in the form of a pressure oscillation between inlets 14, the pressure maxima at each inlet 14 are equalized through each respective lap assembly 20. In this way, the force produced at each inlet 14 is equalized to the other inlet 14, and the energy of oscillation is damped. Thus, the system encounters less wear and tear, and safety of operation is improved.

The present hydraulic damper is configured to damp high frequency pressure differentials and oscillations (i.e. conditions of rapid pressure change having frequencies of 10 Hz or higher) such as occur with wheel shimmy and the like. Each slide 28 includes two notches 44 that are cut into the circumference. The notches 44 are sufficient to bleed a small amount of flow between the internal cavity 30 and the chamber 40, in order to equalize the chamber pressure and the external cavity pressure under static load conditions and low frequency pressure differentials, (i.e. conditions of slow pressure change occurring at less than 2 Hz). Under such conditions, the slide 28 remains in the closed position by the spring 42 regardless of the pressure magnitude across the inlet ports 14. Under high frequency pressure loads, the notch effect is negligible and the slide 28 is driven to the open position. Since the steering operation of an aircraft nose wheel is caused by a slowly rising, low frequency pressure differential, no loss of performance results from using the present damper.

As described hereinabove, the present invention solves many problems associated with previous systems, and presents improved operability. However, it will be appreciated that various changes in the details, materials and arrangements of parts which have been herein described and illustrated in order to explain the nature of the invention may be made by those skilled in the art within the principle and scope of the invention as expressed in the appended claims.

I claim:

1. A damper for reducing pressure differentials in a hydraulic system, said damper comprising:
   a body assembly, including first and second fluid inlet ports, for connecting to a hydraulic system;
   at least one lap assembly for equalizing a pressure differential between the inlet ports, wherein said lap assembly is in fluid connection with each of said inlet ports, and includes a metered passageway fluidly connecting each of said inlet ports;
   a slide, movably retained in said lap assembly to permit reciprocal motion, for alternately blocking and unblocking said metered passageway in response to a predetermined pressure across one of the respective inlet ports, in order to equalize the pressure differential between said ports;
   a chamber in fluid connection with the slide, wherein the chamber retains a quantity of fluid for creating a counter-pressure to resist the motion of the slide.

2. The damper of claim 1 wherein each lap assembly includes an axis, and further comprising:
   an axial passageway for retaining said slide and defining said reciprocal motion in an axial direction;
   an internal cavity, connected to one of said first and second inlet ports, so that a pressure increase across the respective port tends to axially displace the slide;
   an external cavity, opened to the respective other of said first and second inlet ports, wherein said external cavity is displaced radially from the internal cavity, and connected radially to said internal cavity through said metered passageway, wherein said slide normally blocks said metered passageway and unblocks the metered passageway when the pressure increase reaches said predetermined pressure.

3. The damper of claim 2 wherein each lap assembly comprises:
   a closure, received in the body assembly, wherein said closure defines said chamber; and
   a sleeve, retained within said closure, wherein said axial passageway and said internal cavity are axially formed within said sleeve, wherein said external cavity is an annular passageway formed radially along the external periphery of said sleeve, and wherein said metered passageway is formed within the sleeve.

4. The damper of claim 3 wherein the metered passageway comprises a plurality of radial slots.

5. The damper of claim 3 wherein the metered passageway comprises four radial slots, located 90 degrees apart.

6. The damper of claim 1 further comprising a spring for urging the slide into a blocking position for blocking said metering passageway.

7. The damper of claim 1 wherein the slide includes a plurality of radial notches along the external periphery wherein said notches equalize pressure between the chamber and the respective inlet port.

8. The damper of claim 1 wherein the body assembly includes a plurality of cross-connection passageways for fluidly connecting each of said inlet ports to each of said respective lap assemblies.

* * * * *